US012792208B2

(12) United States Patent
Hopper

(10) Patent No.: US 12,792,208 B2
(45) Date of Patent: Nov. 10, 2026

(54) DYNAMIC GRAPHICAL CONTROL OF STRUCTURED INPUT DATA

(71) Applicant: subX, Inc., Portland, ME (US)

(72) Inventor: Calvin Bradford Hopper, Portland, ME (US)

(73) Assignee: subX, Inc., Boston, MA (US)

( * ) Notice: Subject to any disclaimer, the term of this patent is extended or adjusted under 35 U.S.C. 154(b) by 95 days.

(21) Appl. No.: 18/617,928

(22) Filed: Mar. 27, 2024

(65) Prior Publication Data

US 2024/0329822 A1 Oct. 3, 2024

Related U.S. Application Data

(60) Provisional application No. 63/492,281, filed on Mar. 27, 2023.

(51) Int. Cl.

| | |
|---|---|
| ***G06F 3/0486*** | (2013.01) |
| ***G06F 17/10*** | (2006.01) |
| ***G06T 11/26*** | (2026.01) |

(52) U.S. Cl.

CPC ............ *G06F 3/0486* (2013.01); *G06F 17/10* (2013.01); *G06T 11/26* (2026.01)

(58) Field of Classification Search

None

See application file for complete search history.

(56) References Cited

U.S. PATENT DOCUMENTS

| | | | | |
|---|---|---|---|---|
| 11,321,781 | B1 * | 5/2022 | Standard | G06F 3/04845 |
| 11,409,990 | B1 * | 8/2022 | Gleich | G06Q 40/02 |
| 2006/0212820 | A1 * | 9/2006 | Anderson | G06Q 30/08 715/764 |
| 2015/0067568 | A1 * | 3/2015 | Lee | G06F 3/0488 715/771 |
| 2018/0061092 | A1 * | 3/2018 | Sasikumar | G06T 11/203 |
| 2021/0041966 | A1 * | 2/2021 | Heer | G06F 3/04847 |
| 2024/0212049 | A1 * | 6/2024 | Ghelichi | G06F 3/0481 |

* cited by examiner

*Primary Examiner* — Christopher J Fibbi

(74) *Attorney, Agent, or Firm* — PATENT LAW WORKS LLP

(57) ABSTRACT

Systems and methods for dynamic graphical control of structured data input are described. A dynamic graphical control may be included in a user interface generated on a user device from a set of data values. User input to shape the dynamic graphical control is received at the user interface such that modified data values may be determined based on the received user input. The modified data values, including the shaped dynamic graphic control, is displayed on the user interface.

20 Claims, 7 Drawing Sheets

DYNAMIC GRAPHICAL CONTROL OF STRUCTURED INPUT DATA

TECHNICAL FIELD

The present disclosure generally relates to data systems and, more particularly, to dynamic graphical control of structured input data.

BACKGROUND

Input of data within financial and/or operational planning systems largely relies on manual input of data values into data tables. Often, data is inputted to forecast data for multiple periods, which data should follow certain patterns or have a certain structure. For example, a revenue forecast of $1.2 million for the year is expected to accrue evenly for each month, or expected to grow (linearly, log, repeating pattern, etc.) month on month but still add up to $1.2 million. Or, the planner may know exactly certain values but others are uncertain or should vary according to these patterns.

Existing planning systems rely on direct input and manipulation of data values within data tables. For example, some planning systems may be configured with a series of input screens that ultimately lead to a spread of data within a data table. However, these input screens and direct manual manipulation of data values is cumbersome and time consuming.

Systems and methods for improving the manipulation and creation of input data may be advantageous. A reliable and efficient way of modifying data values for structured input may be needed.

SUMMARY

Various aspects for dynamic graphical control of structured input data for data planning systems are described.

An interactive tool by which planners are able to create their input by manipulating a graphical representation, "sculpting" the shape of the data by manually adjusting the graphical tool in intuitive ways is further described herein. A dynamic graphical control may be included in a user interface generated on a user device from a set of data values. User input to shape the dynamic graphical control is received at the user interface such that modified data values may be determined based on the received user input. The modified data values, including the shaped dynamic graphic control, is displayed on the user interface.

The various embodiments advantageously apply the teachings of computer-based planning systems to improve the functionality of such computer systems. The various embodiments include operations to overcome or at least reduce the issues previously encountered in planning systems and, accordingly, are more effective and/or cost-efficient than other planning systems. That is, the various embodiments disclosed herein include hardware and/or software with functionality to improve dynamic graphical control of structured input data. Accordingly, the embodiments disclosed herein provide various improvements to financial and/or operational planning systems.

It should be understood that language used in the present disclosure has been principally selected for readability and instructional purposes, and not to limit the scope of the subject matter disclosed herein.

DETAILED DESCRIPTION

Figure 1:
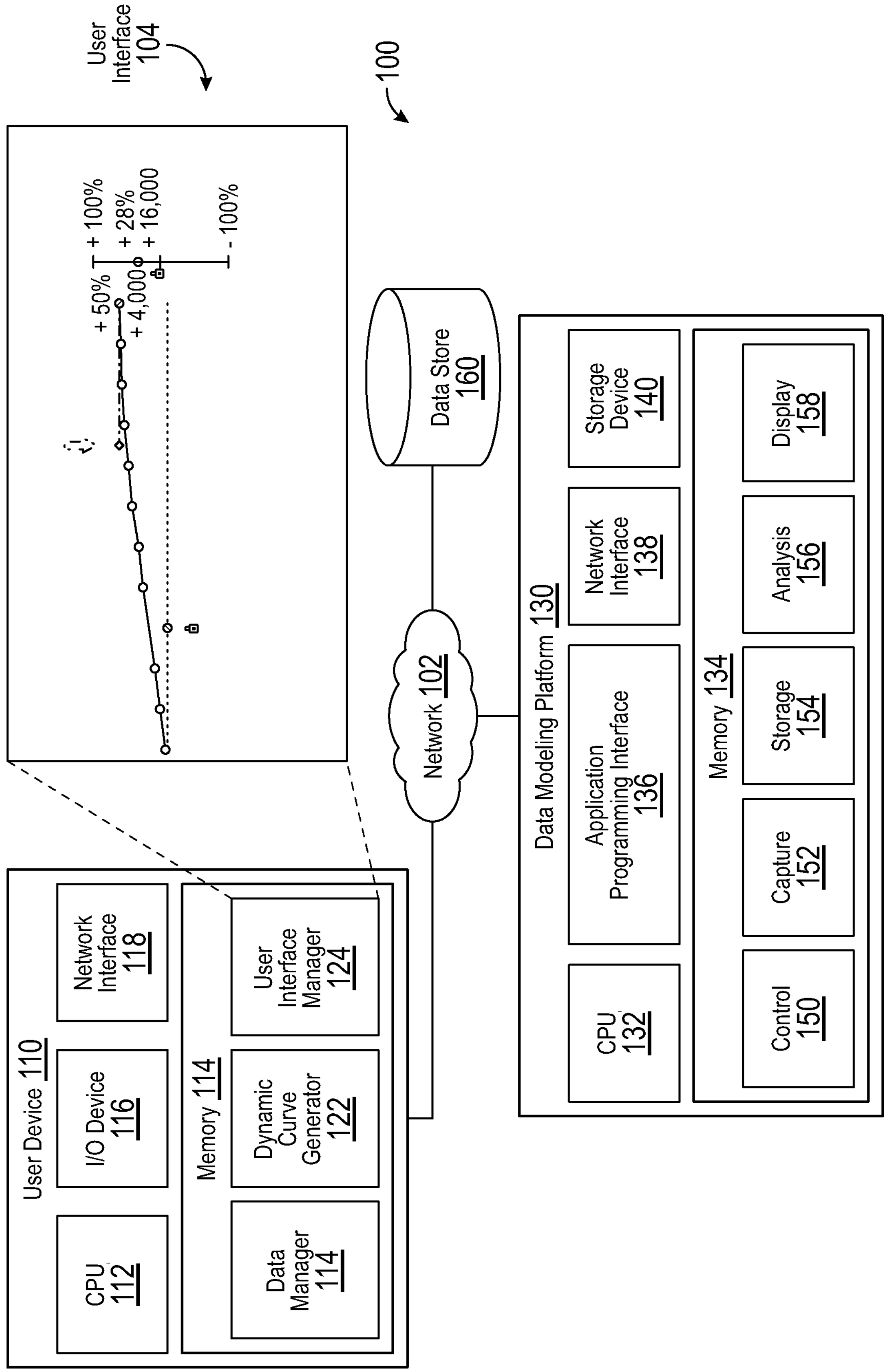
FIG. 1 schematically illustrates a computer-based planning system.

FIG. 1 shows an embodiment of an example planning system 100 with a user device 110 connected, through a network 102, to a data modeling platform 130 for structured input of data from a user interface 104 displayed on the user device 110. While some example features are illustrated, various other features have not been illustrated for the sake of brevity and so as not to obscure pertinent aspects of the example embodiments disclosed herein. In some embodiments, user device 110 and data modeling platform 130 are computer-based components that may be interconnected by a network 102. Additional components of an example planning system 100, such as data store 160, may also be connected to network 102.

In some embodiments, one or more networks 102 may be used to communicatively interconnect various components of planning system 100. For example, each component, such as user device 110, data modeling platform 130 and data store 160, may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, user device 110 may be on a limited access network such that control data may only be transmitted between a user device 110 and data modeling platform 130, enabling the data modeling platform 130 to securely receive structured data input through the user device 110 and enable real-time manipulation of the structured data through a dynamic graphical control.

User device 110 may be any suitable computer device, such as a computer, a computer server, a laptop computer, a tablet device, a netbook, an internet kiosk, a personal digital assistant, a mobile phone, a smart phone, a gaming device, or any other computing device. User device 110 is sometimes called a host, client, or client system. In some embodiments, user device 110 may host or instantiate one or more applications for interfacing with planning system 100. For example, user device 110 may be a personal computer or mobile device running a financial planning management application configured to provide a user interface for data modeling platform 130. In some embodiments, user device 110 may be configured to access data accessible by the data modeling platform 130 directly through network 102. In some embodiments, one or more functions of data modeling platform 130 may be instantiated in user device 110 and/or one or more functions of user device 110 may be instantiated in data modeling platform 130.

User device 110 may include one or more processors 112 for executing compute operations or instructions stored in memory 114 for accessing planning data and other functions of data modeling platform 130 through network 102. In some embodiments, processor 112 may be associated with memory 114 and input/output device 116 for executing both data display operations and planning system management operations. Processor 112 may include any type of processor or microprocessor that interprets and executes instructions or operations. Memory 114 may include a random access memory (RAM) or another type of dynamic storage device that stores information and instructions for execution by processor 112 and/or a read only memory (ROM) or another type of static storage device that stores static information and instructions for use by processor 112 and/or any suitable storage element. In some embodiments, user device 110 may allocate a portion of memory 114 and/or another local storage device (in or attached to user device 110) for storing planning data for user device 110. In some embodiments, user device 110 may include one or more input/output (I/O) devices 116. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 110. Network interface 118 may include one or more wired or wireless network connections to network 102. Network interface 118 may include a physical interface, such as an ethernet port, and/or related hardware and software protocols for communication over network 102, such as a network interface card, wireless network adapter, and/or cellular data interface.

User device 110 may include a plurality of modules or subsystems that are stored and/or instantiated in memory 114 for execution by processor 112 as instructions or operations. For example, memory 114 may include a data manager 120 configured to provide a user interface for selectively creating, manipulating, and displaying real-time, near real-time, and/or stored structured data for planning in the data modeling platform 130. Memory 114 may include dynamic curve generator 122 configured to dynamically render curves responsive to user input received at a user interface 104. Memory 114 may include a user interface manager 124 configured to provide a user interface 104 for generating, modifying, and shaping data received through user device 110. Memory 114 may include other modules, not illustrated, configured to perform functionality of the user interface 104, including rendering data values as graphical user interface elements such as control points, toggles, sliders, and graphical control curves using traditional Bezier curve mathematical formulas.

Data modeling platform 130 may include a housing and a bus interconnecting at least one processor 132, at least one memory 134, at least one storage device 140, and at least one interface, such as application programming interface 136 and/or network interface 138. The housing (not shown) may include an enclosure for mounting the various subcomponents of data modeling platform 130, locating any physical connectors for the interfaces, and protecting the subcomponents. Some housings may be configured for mounting within a rack system. The bus (not shown) may include one or more conductors that permit communication among the components of data modeling platform 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, data modeling platform 130 may include application programming interface 136 configured to transfer data between the data modeling platform 130, data store 160, and/or a user device 110 through network 102. For example, application programming interface 136 may include functionality for data to be easily transferred between components of the planning system 100. In some embodiments, data modeling platform 130 may include multiple application programming interfaces 136 for communication with different types of applications on user devices 110 and/or data stores 160 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store data, such as a hard disk drive (HDD), solid state drive (SSD), flash memory-based removable storage (e.g., secure data (SD) card), embedded memory chips, etc. In some embodiments, storage device 140 is, or includes, a plurality of solid-state drives.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Data modeling platform 130 may include a plurality of modules or subsystems that are stored and/or instantiated in memory 134 for execution by processor 132 as instructions or operations. For example, memory 134 may include a user interface (UI) control subsystem 150 configured to control user interfaces 104 operating on user devices 110. Memory 134 may include a data capture subsystem 152 configured to receive data generated from user devices 110. Memory 134 may include a data storage subsystem 154 configured to store received data in storage device(s) 140 and/or data store 160 over the network 102. Memory 134 may include a data analysis subsystem 156 configured to analyze data for defined patterns, such as repeating data values, recognized mathematical curves, such as linear, logarithmic, and exponential growth, and combinations thereof. Memory 134 may include a data display subsystem 158 configured to selectively display data on user device 110, which may be attached to data modeling platform 130 or remotely connected via network 102. In some embodiments, the functions of dynamic curve generator 122 may be integrated in data modeling platform 130 and instantiated in memory 134 as a dynamic curve generating subsystem and/or a subset of functions of analysis subsystem 156.

In some embodiments, planning system 100 may include one or more remote and/or cloud-based resources for supporting the functions of data modeling platform 130 and/or user device 110. For example, planning system 100 may include a data store 160 configured to host some, all, or select portions of the storage functions of data modeling platform 130, such as a cloud-based network attached storage system, distributed storage system, or on-premise data storage system. In some embodiments, the majority of functions described above for data modeling platform 130 may reside in data modeling platform 130 and select functions may be configured to leverage additional resources in a network server (not pictured) and/or data store 160. For example, a network server may be configured to support specialized and/or processing intensive numerical algorithms to supplement data analysis subsystem 156, and/or data store 160 may be configured to support archiving of data for longer term storage.

Figure 2A:
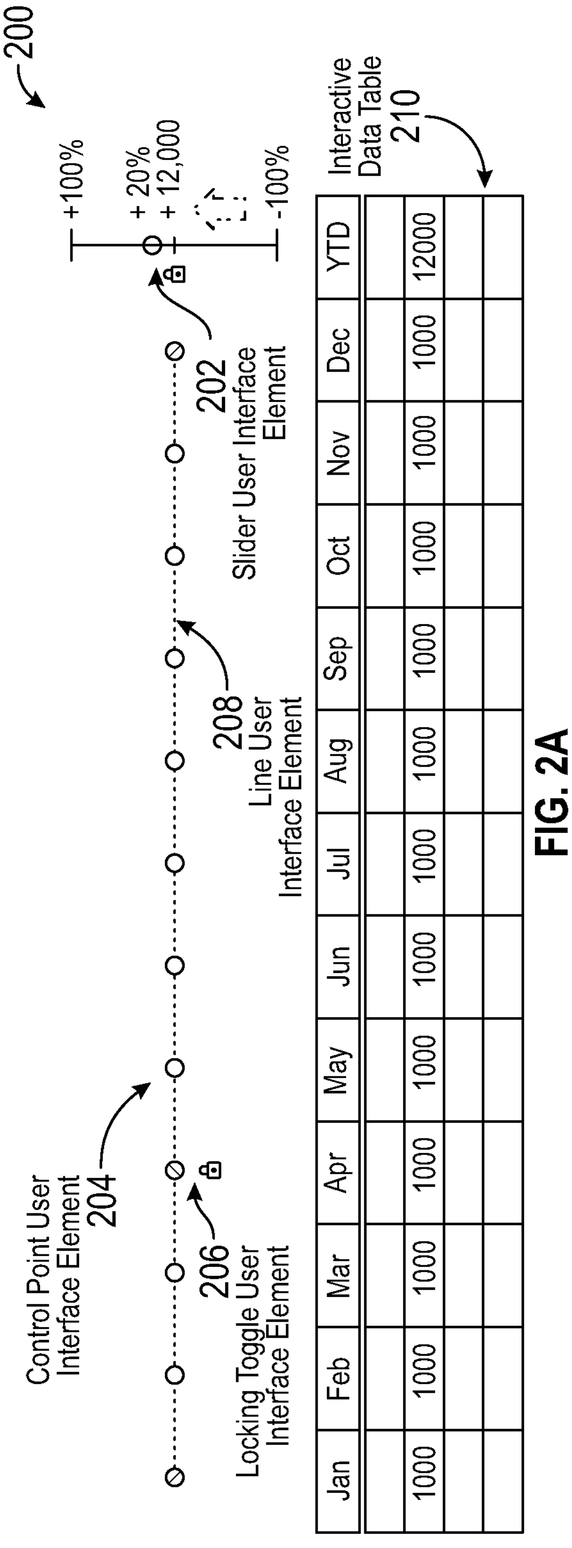
FIGS. 2*a*-2*f* schematically illustrate example user interfaces that may be implemented by the computer-based planning system of FIG. 1.

FIGS. 2*a*-2*f* shows example user interfaces that during normal operation that may be implemented in a computer-based planning system 200, such as planning system 100 in FIG. 1. In FIG. 2*a*, an example user interface includes a slider user interface element 202 that enables a user to increase a forecasted projection of data by a certain percentage, such as +20%, over the prior year's data. The slider user interface element 202 may include a numeric value that represents the increase, such as +12,000. FIG. 2*a* also illustrates a control point user interface (UI) element 204 that appear as dots on a line user interface element 208. Each control point UI element 204 may be dragged upwards or downwards, in the same direction as the slider user interface element 202 that indicates a percentage increase or decrease. A locking toggle user interface element 206 may be indicated by a lock symbol on a control point UI element 204 and differentiated by color, in an embodiment. Below the control interface that includes the control points 204 and line 208 drawn between the control points, an interactive data table 210 may be displayed that provides numeric data values corresponding to the underlying data being planned. In FIG. 2A, an example of 1000 per month, totally 12000 for year to date (YTD) is shown for illustration purposes. In an embodiment, this baseline forecast may be generated to provide a user a basis for beginning the process of "sculpting" the data based on the uploaded data in the planning system 200.

Figure 2B:
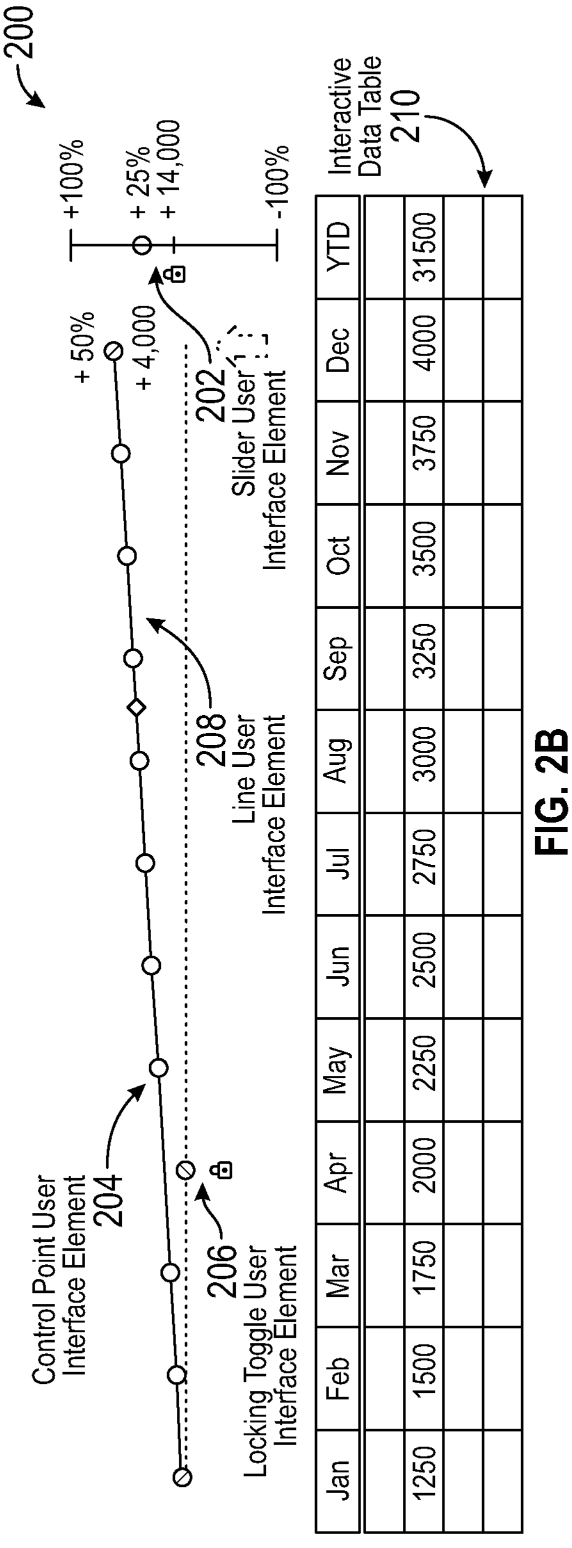

In FIG. 2*b*, the control point UI element 204 above the last month in the data table 210, December, has been dragged upwards to +50% or +4,000. This has caused a linear increase across the line UI element 208 with a straight line upward. The slider UI element 202 reflects the change in the underlying data, +25% or +14,000. The data values in the interactive data table 210 are similarly updated, according to data values uploaded to the planning system 200 and the various formulas and algorithms implemented in the system 200.

Figure 2C:
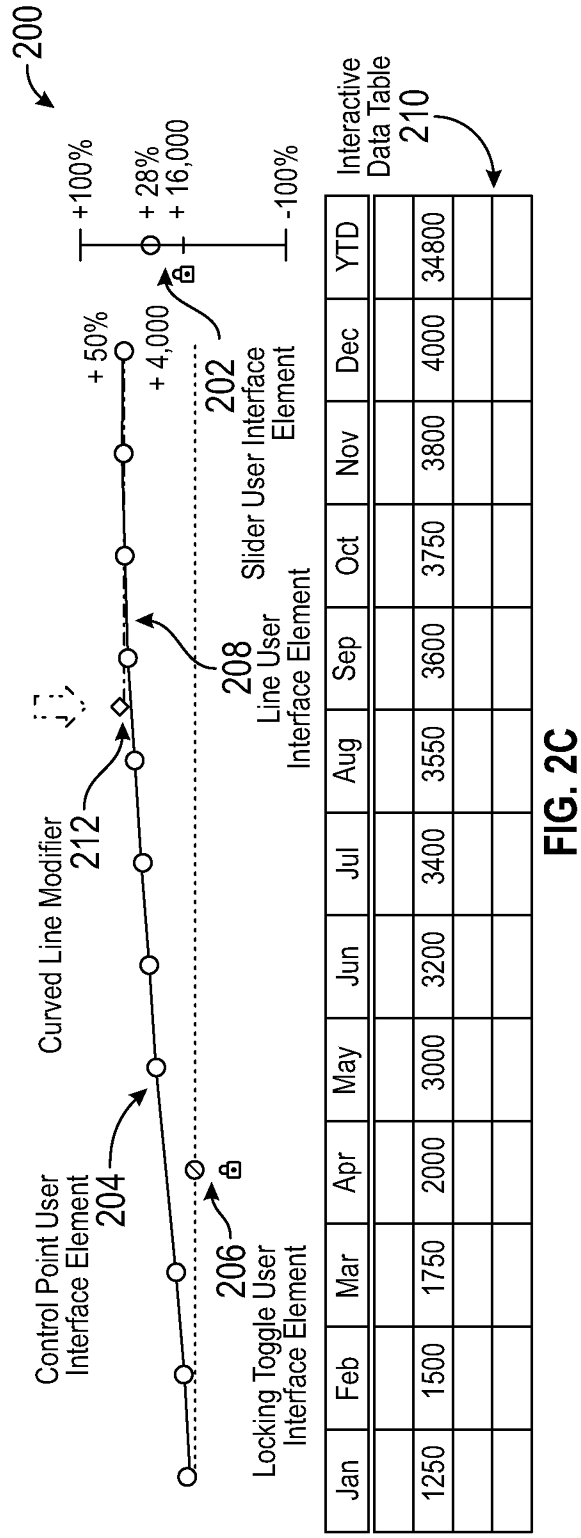

In FIG. 2*c*, a curved line modifier 212 is dragged leftwards to introduce a curve in the line user interface element 208. The curved line modifier 212 is represented by a blue diamond in FIG. 2*c*, as an example, but other symbols or differentiating attributes may be used. The curved line modifier 212 may rely on Bezier curve calculations to determine the curvature of the line, in an embodiment. The slider UI element 202 indicates the effect of the curved line modifier 212, showing a +28% increase, or +16,000. Additionally, the interactive data table 210 reflects updated data values, showing the impact of the curved line modifier 212.

Figure 2D:
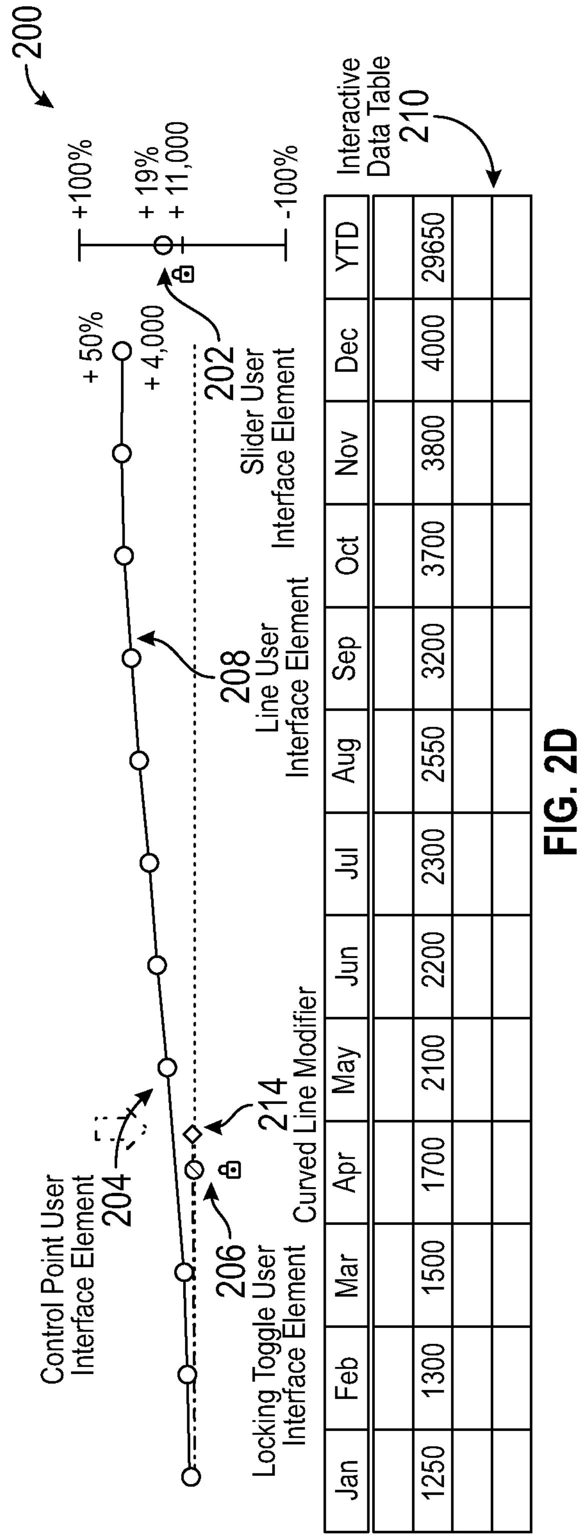

In FIG. 2*d*, a second curved line modifier 214 is dragged downward to introduce a new curve in the line UI element 208. The slider UI element 202 indicates the effect of the curved line modifier 214, showing a +19% increase, or +11,000. Similarly, the interactive data table 210 reflects updated data values, showing the impact of the curved line modifier 214.

Figure 2E:
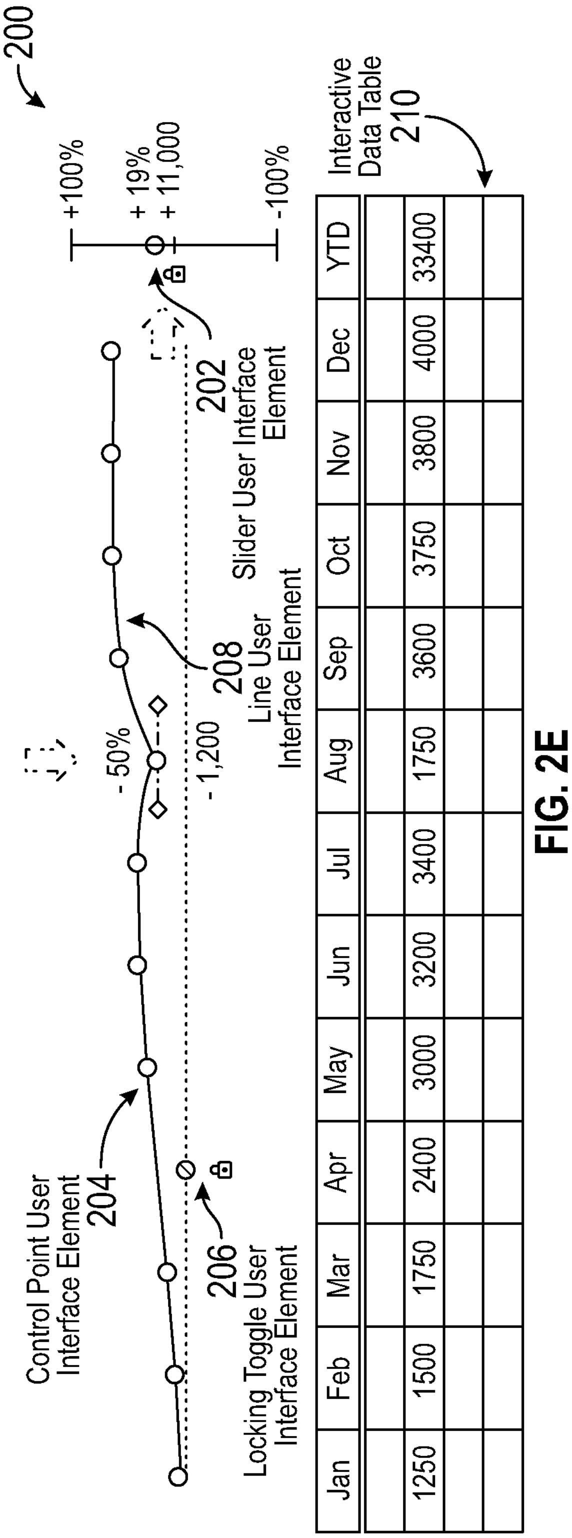

In FIG. 2*e*, a known value is introduced through the control point UI element 204 over the month of August. This may correspond to the user inputting the known value for that month, or known decrease in percentage, here −50% or −1,200. However, because the slider UI element 202 has been toggled to a "lock," the expected overall increase of +19% or +11,000 from FIG. 2*d* remains the same. The interactive data table 210 is updated to show the impact of the known value in August.

Figure 2F:
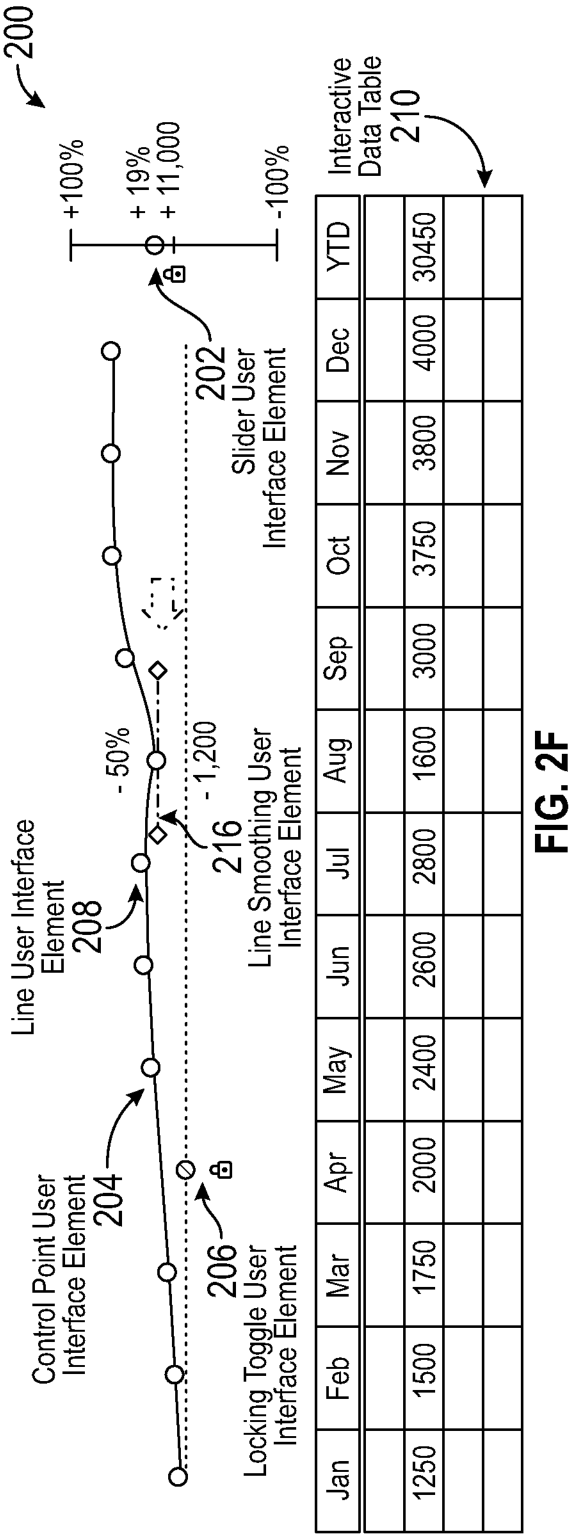

In FIG. 2*f*, a line smoothing user element 216 is used to smooth the line UI element 208. For example, the user may identify the known data value in August, but may identify that the growth in the value for the next month, September, may be more gradual than shown in FIG. 2*e*. Thus, the data may be "sculpted" using Bezier curve calculations to introduce more curvatures in the line UI element 208 by dragging one or more diamond icons outwards horizontally from the control point UI element 204 at the known value. The interactive data table 210 is updated with new values that reflect the impact of the user input on the line smoothing UI element 216.

Figure 3:
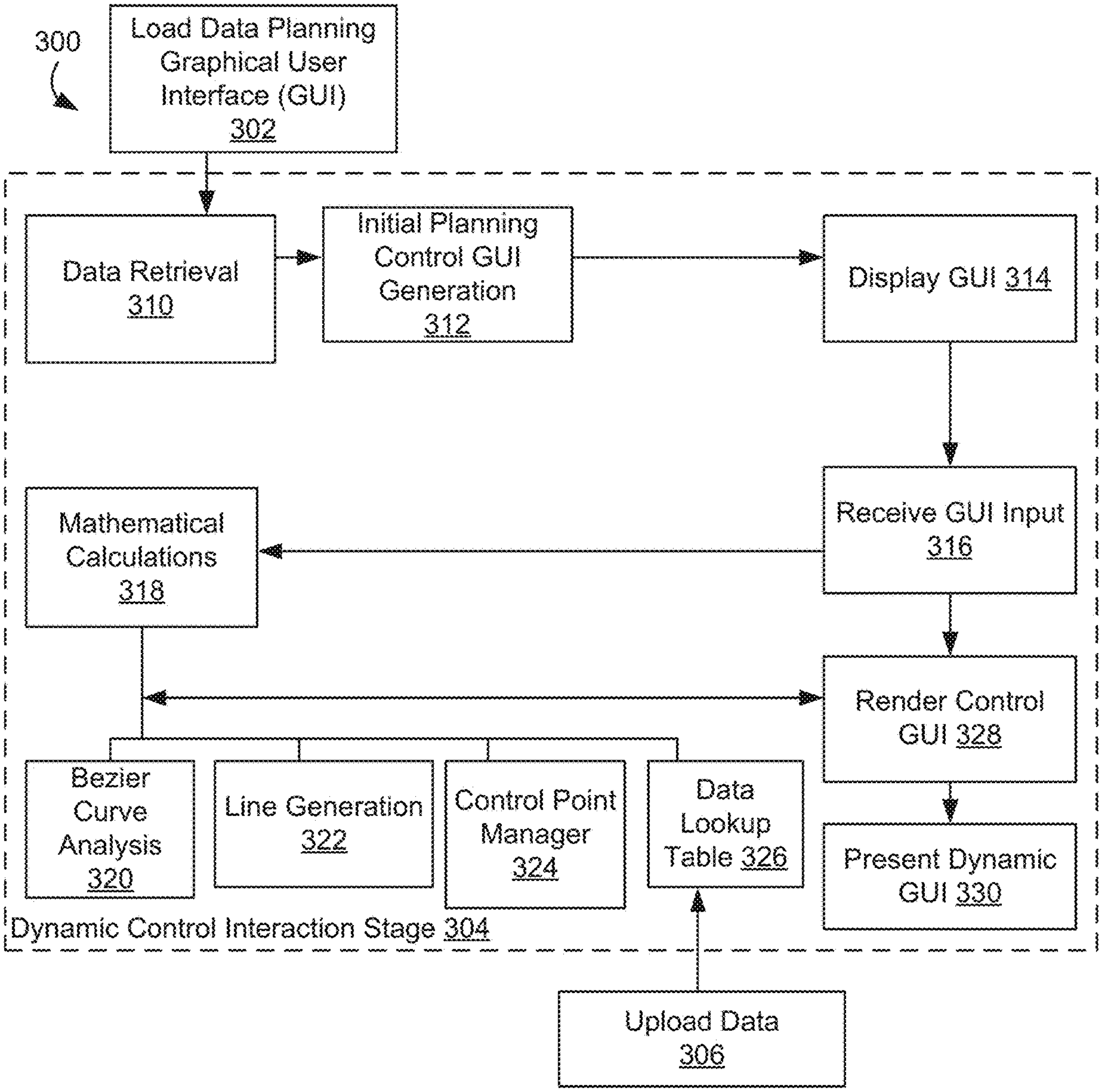
FIG. 3 schematically illustrates a dynamic control interaction stage of the computer-based planning system of FIG. 1.

FIG. 3 schematically shows a dynamic control interaction stage that during normal operation that may be implemented in a computer-based planning system 300, such as planning system 100 in FIG. 1. At block 302, a data planning graphical user interface (GUI) is loaded. For example, upon operation of planning system 200, the data planning GUI is loaded on an application operating on a user device connected to the data modeling platform. In some embodiments, the GUI is loaded with data from an existing project in the planning system 300.

In some embodiments, a dynamic control interaction stage 304 may be initiated during or after the data planning GUI has been loaded. For example, a data modeling platform may be connected to planning system 300 and/or instantiated in one of the components thereof. In some embodiments, the timing and length of dynamic control interaction stage 304 may be continuous based on the user input interactions with the user interface connected to the data modeling platform.

In some embodiments, dynamic control interaction stage 304 may be completed only once. In some embodiments, dynamic control interaction stage 304 may be re-executed in response to events, changes, or updates that may change the data planning (e.g., known data values, unexpected events, data patterns emerging, etc.) that require a modification to an existing data spreading plan.

During dynamic control interaction stage 304, data may be retrieved at block 310. For example, the planning system 300 may include data from an existing project that may be retrieved during or after the data planning GUI is loaded. At block 312, an initial planning control GUI may be generated. For example, the control GUI may include control points corresponding to data values, a line connecting the control points, and a slider GUI corresponding to an aggregated data value.

After the initial planning control GUI generation at block 312, the GUI may be displayed at block 314. For example, the GUI may include an interactive data table that shows the data values being created by interacting with the control points, line connecting the control points, and the slider GUI by a user through the user interface on a user device connected to the planning system 300 or instantiated in an interconnected data modeling platform.

After the display of the GUI at block 314, GUI input may be received at block 316. For example, a control point may be dragged upwards or downwards to indicate an increase or decrease in the corresponding data value, as described above and illustrated with respect to FIGS. 2*a*-2*f*, where the control point may be selected via the user interface at the user device connected to the planning system 300 or instantiated in an interconnected data modeling platform. Additionally, other GUI input may be received at block 316, such as a slider GUI receiving user input to slide an element upwards or downwards that corresponds to increasing or decreasing an aggregate data value. Further, curvature may be added to the line GUI element connecting the control points as GUI input that may be received at block 316. By adding curvature to the line through dragging an icon connected to the line GUI element in any direction, the "shape" of the data may be "sculpted" such that data values may be modified in the interactive data table. In some embodiments, the curvature may be a "smoothing" type of user interaction in which the line or curve is smoothed or flattened by dragging an icon outwards. Another type of GUI input that may be received at block 316 includes "locking" an element at a certain data value. For example, a slider GUI element may be locked to ensure that the aggregate data value remains at a certain percentage increase, such as 19%, or data value increase, such as +11,000. A toggle or other user interaction may be used to "lock" in a certain data value for an element. As another example of "locking," a control point may be locked in at a particular data value, where the user knows a certain value or percentage increase or decrease may occur.

After receiving GUI input at block 316, mathematical calculations may be executed at block 318 to help render a control GUI at block 328. In some embodiments, mathematical calculations 318 may include Bezier curve analysis 320. For example, Bezier curve analysis may use traditional Bezier curve calculations to determine a curvature of a line between at least two control points. The Bezier curve analysis 320 may include one or more modules to determine data values corresponding to the curvature of the line.

In some embodiments, mathematical calculations 318 may include line generation 322. For example, line generation 322 may include a graphical method that draws the line between control points in the GUI based on the GUI input received and the data values retrieved at block 310.

In some embodiments, mathematical calculations 318 may include a control point manager 324. For example, the control points correspond to a created data value in the interactive data table. In an embodiment, the retrieved data at block 310 may serve as a baseline value for the control points, but as the user interacts with the control GUI, the control points may shift upwards or downwards, consequently changing the corresponding created data value in the interactive data table. The control point manager 324 may track the data values associated with the control points in the GUI.

In some embodiments, mathematical calculations 318 may include a data lookup table 326. For example, a data lookup table may be instantiated with data retrieved at block 310 to provide a baseline data set. In an embodiment, the data lookup table 326 may receive uploaded data at block 306. The data lookup table 326 may also be used to store various mathematical calculations 318, such as linear, logarithmic, exponential, and other increases or decreases of the data values. Additionally, various constants and formulas may be used and stored with respect to the data lookup table 326 to work in conjunction with Bezier curve analysis 320, line generation 322, and/or control point manager 324.

Based on the mathematical calculations 318, a control GUI may be rendered at block 328. For example, the control GUI may include at least one of the following: the control points corresponding to the calculated data values based on the received GUI input at block 316, the line drawn between those control points, a curve modifier icon for introducing curvature to the line between control points, a locking toggle element for enabling a user to lock in a certain value or percentage, and a slider GUI associated with the aggregate data value.

After the control GUI is rendered at block 328, the dynamic GUI is presented at block 330. This includes an updated data values corresponding to the control points on the line that have been modified based on the received GUI input at block 316. The dynamic control interaction stage 304 may repeat continuously as additional GUI input is received.

Figure 4:
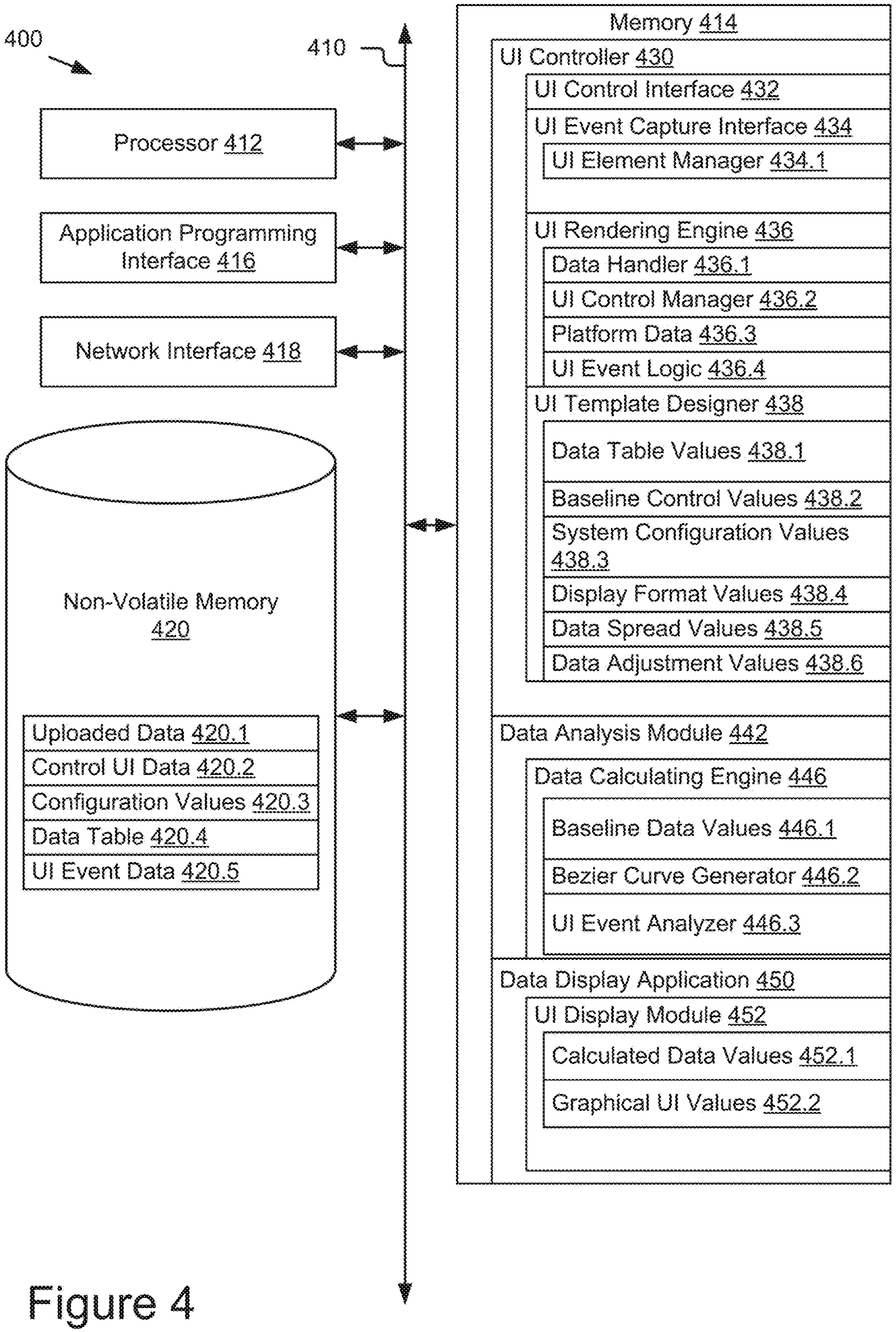
FIG. 4 schematically some elements of the computer-based planning system of FIG. 1.

FIG. 4 schematically shows selected modules of a planning system 400 configured for dynamic graphical control for structured data input. Planning system 400 may incorporate elements and configurations similar to those shown in FIGS. 1-3. For example, planning system 400 may be configured in a data modeling platform similar to data modeling platform 130. In some embodiments, one or more of the selected modules may access or be instantiated in the processors, memories, and other resources of user devices similar to user device 110. For example, a user device 110 and its embedded or attached compute resources may be configured with some or all functions of UI controller 430 to provide real-time user interface control of data values in a distributed fashion at the edge of planning system 400 before selectively providing the data values to other system components, such as a data modeling platform, for additional analysis and/or use in a planning application.

Surveillance system 400 may include a bus 410 interconnecting at least one processor 412, at least one memory 414, and at least one interface, such as application programming interface 416 and network interface 418. Bus 410 may include one or more conductors that permit communication among the components of planning system 400. Processor 412 may include any type of processor or microprocessor that interprets and executes instructions or operations. Memory 414 may include a random access memory (RAM) or another type of dynamic storage device that stores information and instructions for execution by processor 412 and/or a read only memory (ROM) or another type of static storage device that stores static information and instructions for use by processor 412 and/or any suitable storage element such as a hard disk or a solid state storage element. In some embodiments, processor 412 and memory 414 may be compute resources available for execution of logic or software instructions stored in memory 414 and computation intensive tasks, such as UI rendering engine 436, may be configured to monitor and share these resources.

Application programming interface 416 may be configured for connection with one or more user devices and/or data modeling platforms. For example, application programming interface 416 may include a software interface that enables data transfer and/or communications between applications operating on user devices 110 and/or data modeling platform 130.

Network interface 418 may include one or more wired or wireless network connections to network, similar to network 102. Network interface 418 may include a physical interface, such as an ethernet port, and related hardware and software protocols for communication over the network, such as a network interface card or wireless adapter.

Surveillance system 400 may include one or more non-volatile memory devices 420 configured to store data. For example, non-volatile memory devices 420 may include a plurality of flash memory packages organized as an addressable memory array and/or one or more solid state drives or hard disk drives. In some embodiments, non-volatile memory devices 420 may include a plurality of storage devices within, attached to, or accessible by a data modeling platform for storing and accessing data.

Planning system 400 may include a plurality of modules or subsystems that are stored and/or instantiated in memory 414 for execution by processor 412 as instructions or operations. For example, memory 414 may include a UI controller 430 configured to control at least one user interface operating on a user device 110, capture and store user input from that user device, provide real-time analysis, and enable user access, such as through data display application 450. Memory 414 may include a data storage estimator configured to calculate an estimate of storage requirements based on usage. Memory 414 may include a data display application configured to provide a user interface for displaying and managing data values and/or planning system 400.

User interface (UI) controller 430 may include interface protocols, functions, parameters, and data structures for connecting to and controlling user interfaces operating on user devices, capturing and storing data from those user interfaces, and interfacing with data analysis module 442 and data display application 450. For example, user interface controller 430 may be an application and/or corresponding hardware in a data modeling platform configured for network and/or direct communication with a set of associated user devices. UI controller 430 may be configured as a central point for data planning from the associated user devices that enables analysis of captured user input by analytics engines and presentation of transformed data to a user through data display application 450. In some embodiments, UI controller 430 may be divided among one or more data modeling platforms, server, and/or user device.

In some embodiments, UI controller 430 may include a plurality of hardware and/or software modules configured to use processor 412 and memory 414 to handle or manage defined operations of UI controller 430. For example, UI controller 430 may include a UI control interface 432, a UI event capture interface 434, a UI rendering engine 436, and a UI template designer 438.

UI control interface 432 may include UI interface protocols and a set of functions, parameters, and data structures for using, configuring, communicating with, and providing command messages to user interfaces on applications operating on user devices through application programming interface 416 and/or network interface 418. For example, UI control interface 432 may include an API and command set for interacting with applications in each user device to access one or more UI functions. In some embodiments, UI control interface 432 may be configured to set UI configuration parameters for UI elements, such as sliders, toggles, control points, lines connecting control points, and/or otherwise manage operation of user interfaces. For example, UI control interface 432 may maintain a UI configuration table, pages, or similar data structures that includes entries for each user interface being managed and their respective user device-specific configuration parameters, active control features, and other configuration and control information for managing the user interfaces.

UI event capture interface 434 may include interface protocols and a set of functions, parameters, and data structures for receiving UI event data from associated user devices and/or user interfaces. For example, UI event capture interface 434 may include data channels and related data buffers for managing a plurality of user interface events. In some embodiments, each user interface may a dedicated data channel for continuously and/or selectively sending its event data to UI event capture interface 434. For example, received UI event data may be buffered by UI event capture interface 434 before being transported to UI rendering engine 436, UI template designer 438, and data analysis module 442. In some embodiments, UI event capture interface 434 may be configured to transport data to the data analysis module 442 during a dynamic control interaction stage. In some embodiments, UI event capture interface 434 may receive or generate data based on received data analysis.

In some embodiments, UI event capture interface 434 may include a UI element manager 434.1 configured to identify and manage the UI elements sending UI event data from the user devices. For example, UI element manager 434.1 may manage status and state of each UI element. In some embodiments, UI element manager 434.1 may selectively send data to data analysis module 442 for data analysis to identify data value patterns and/or provide a notification to data analysis module 442 of the availability and storage location of data for analysis in non-volatile memory 420. In some embodiments, UI element manager 334.1 may include configurable UI elements. For example, a slider GUI, a control point, a line connecting multiple control points, a curve modifier, and other UI elements may each be configured for specific processing, priority, and timing, including selective allocation of compute resources to support each UI element.

UI rendering engine 436 may include one or more rendering algorithms and a set of functions, parameters, and data structures for processing user input received from associated user devices and/or user interfaces to enable real-time or near-real-time response to received user input, where the response is a graphical rendering of the UI element responsive to the received user input. In some embodiments, UI rendering engine 436 may include a data handler 436.1 configured to determine different types of data represented by UI elements and incorporate methods of handling the data accordingly.

In some embodiments, data handler 436.1 may be configured for one or more data types, sometimes referred to as a data class, such as inventory, currency, operational metrics, etc. Data handler 436.1 may interact with a UI control manager 436.2, such as a software module to track and manage status of UI controls. In some embodiments, UI rendering engine 436 may be configured for a plurality of data types and include data handlers trained to each data type. Data handler 436.1 may be configured to interact with other data including platform data 436.3. For example, platform data 436.3 may include position information of UI elements, such as rendering canvas coordinates, graphical information regarding icons and other visual elements, and data type or class. UI event logic 436.4 may include a plurality of event conditions based on detected data objects and whether other systems or subsystems should be notified of the UI event. These event conditions may include logical evaluation of one or more parameters from the output data, generally comparing output data parameters to corresponding UI event threshold parameters for determining a UI event. As another example, UI event logic 436.4 may include descriptive information of a UI event occurring, such as a recognized hand gesture, a recognized user input on a UI control, such as dragging a UI element upwards, downwards, or in other directions. In some embodiments, UI control manager 436.2 may interact with control UI data 420.2 stored in non-volatile memory 420, such as graphical icon data for rendering purposes. In some embodiments, platform data 436.3 may be stored as configuration values 420.3 in non-volatile memory 420, such as a data table of metadata tags associated with uploaded data 420.1.

UI template designer 438 may enable the template design of a user interface (UI) to represent data table values 438.1 corresponding to the baseline control values 438.2 from a data table 420.4 stored in non-volatile memory 420. For example, uploaded data 420.1 may be copied to a data table 420.4 such that baseline control values 438.2 may be generated, such as an increase by 20% of product sales for the year. The baseline control values 438.2 may be generated by data analysis module 442 having a data calculating engine 446 to create baseline data values 446.1. For example, the uploaded data 420.1 may include data representing product sales for the past year by month. Using system configuration values 438.3, which may, in some embodiments, correspond to configuration values 420.3 stored in non-volatile memory 420, the UI template designer 438 may identify an initial data planning shape of an overall increase of sales by 20%, resulting in the flat control line depicted in FIG. 2*a*. In some embodiments, display format values 438.4 may be received via a user device connected through a network interface 418 and stored in configuration values 420.3 in non-volatile memory 420. For example, different user devices have display format values 438.4, such as screen resolution, number of pixels, screen dimensions, etc.

In some embodiments, UI template designer 438 may be configured to data spread values 438.5 as calculated by data calculating engine 446 in the data analysis module 442 to determine data adjustment values 438.6, such as the values of data adjustment that has occurred based on the template design. For example, the 20% increase in product sales may be reflected as an actual data value and spread amongst a number of divisions, such as 12 months in a year. Thus, the data spread values 438.5 may be reflected in an interactive data table 420.4, as stored in the non-volatile memory 420. Data adjustment values 438.6, in this example, may refer to the numerical value of the number of increased product sales, such as +12,000, as shown in FIG. 2*a*.

In some embodiments, UI event logic 436.4 may include logical rules configured to trigger data analysis from the data analysis module 442. For example, UI event logic 436.4 may be embodied in a rules engine that receives and/or maintains state information for UI elements and data analysis of data table values 438.1, data spread values 438.5, data adjustment values 438.6 and/or baseline data values 446.1 to determine patterns, curves, and/or other data analysis responsive to user input at the UI event capture interface 434. In some embodiments, UI event logic 436.4 may be configured to determine events that are used as triggers for generating various recognized patterns, such as linear growth curve, logarithmic growth curve, and exponential growth curve. For example, user input received at the UI event capture interface 434 may indicate the user "sculpting" the data to form an exponential curve by dragging control points in an exponential curve shape on the user interface. The UI event logic 436.4 may recognize such an exponential curve and, through the UI event analyzer 446.3 from the data analysis module 442, generate baseline data values 446.1 that correspond to the recognized exponential curve. Additionally, the Bezier curve generator 446.2 may be used to modify a line connecting control points to add curvature. For example, a user may wish to add a sharper exponential curve between two control points by dragging a modifier icon to create a sharper, more exponential curve. The data analysis module 442 would, based on this user input captured at the UI event capture interface 434, be triggered to generate data that corresponds to the sharper exponential curve. In some embodiments, UI event logic 436.4 may generate an event notification and send it over a network to data display application 450 to automatically execute one or more user-defined operations, such as implementing a known exponential curve on the UI display module 452 using calculated data values 452.1 and graphical UI values 452.2 for the known exponential curve.

In some embodiments, data analysis module 442 may include a data calculating engine 446 for generating data calculations in collaboration with the received user input from the UI event capture interface 434. For example, data calculating engine 446 may rely on baseline data values 446.1 to calculate related graphical data points for a Bezier curve as determined by a Bezier curve generator 446.2 based on the system configuration values 438.3 and display format values 438.4. In some embodiments, data calculating engine 446 may include a UI event analyzer 446.3 for analyzing the status of UI elements from the UI element manager 434.1 and use UI event logic 436.4 to determine recognized curves and patterns, as described above. In an embodiment, the amount of distance of received user input and the directionality of the received user input are data points captured by the UI event capture interface 434 and are used in by the Bezier curve generator 446.2 to render the amount of curvature in a new line. Additionally, various templates may include data table values 438.1 that include data spread values 438.5 and data adjustment values 438.6 associated with recognized curves and patterns for use by the data analysis module 442. For example, a known logarithmic curve may be used in response to user input indicating the user's desire to smooth out or flatten a curve between control points. The known logarithmic curve may be associated with data spread values 438.5 and/or UI event data 420.5.

Data display application 450 may include data interface protocols and a set of functions, parameters, and data structures for managing display of data at a user device through a user interface for a viewing user to continue shaping or manipulating structured data for planning purposes. For example, data display application 450 may operate a user interface upon which a UI controller 430 generates a UI control interface 432 and uses a UI event capture interface 434 to record user input. In some embodiments, uploaded data 420.1 appears on the data display application 450 as an interactive data table. Additionally, the UI rendering engine 436 manages the rendering of the user interface on the data display application 450. For example, planning system 400 may support continuous display and/or capture of user input at the user interface on a user device operating the data display application 450. The UI display module includes, in some embodiments, calculated data values 452.1 from the data calculating engine 446 and graphical UI values 452.2 from the UI rendering engine. In some embodiments, configuration values 420.3 are used by the data display application 450 to generate a user interface that is correctly formatted for the user device.

Data display application 450 may include interface protocols, functions, parameters, and data structures for providing a user interface for generating and modifying data planning and/or displaying data in the planning system 300, such as through UI controller 430. For example, data display application 450 may be a software application running on a user device integral to, connected to, or in network communication with UI controller 430 and/or a data modeling platform. In some embodiments, data display application 450 may run on a separate computing device from UI controller 430, such as a personal computer, mobile device, or other user device. In some embodiments, data display application 450 may be configured to interact with APIs presented by an access/display manager.

In some embodiments, data display application 450 may include a plurality of hardware and/or software modules configured to use processor 412 and memory 414 to handle or manage defined operations of data display application 450. For example, data display application 450 may include a UI display module 452.

The UI display module 452 may include a set of functions, parameters, and data structures for navigating and displaying data generated through UI controller 430. For example, the UI display module 452 may include a graphical user interface and interactive controls for displaying lists, tables, thumbnails, or similar interface elements for selecting and displaying data planning for various purposes. In some embodiments, the UI display module 452 may enable split screen display of multiple planning operations. This would enable a viewing user to identify different scenarios with different manipulations of the underlying data, as illustrated in FIGS. 2*a*-2*f*.

Figure 5:
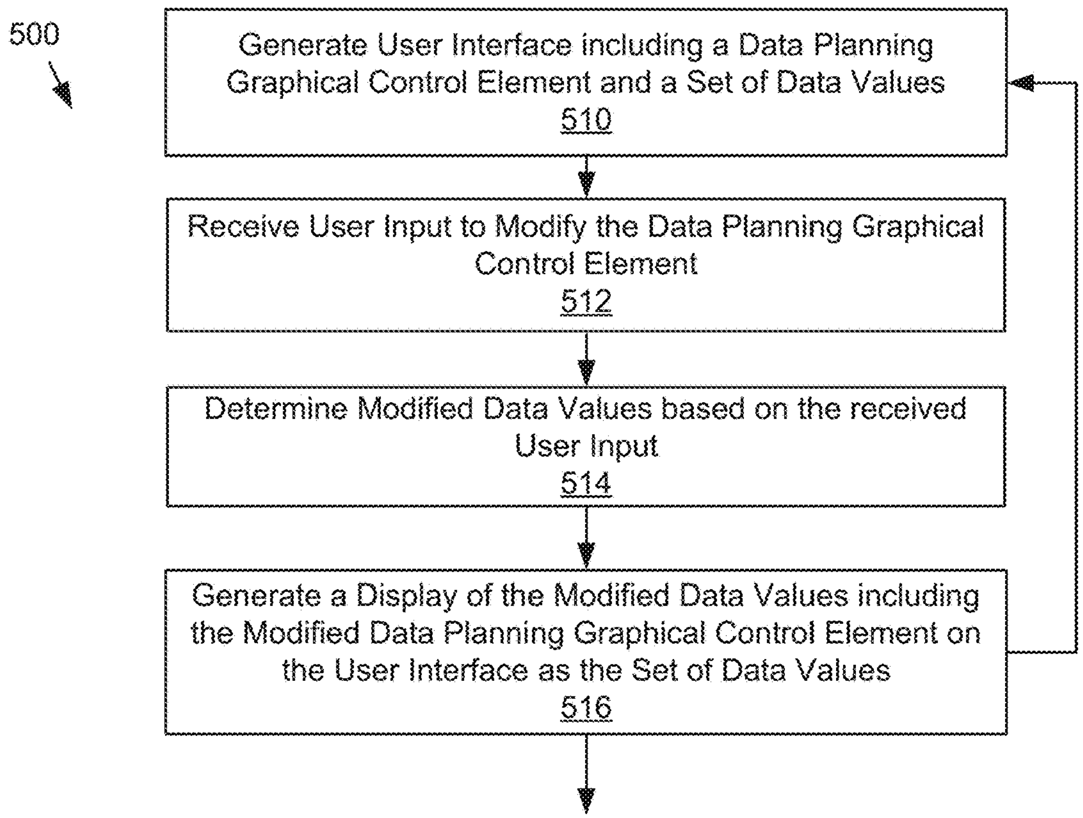
FIG. 5 is a flowchart of an example method of generating a dynamic graphical control for structured data input.

As shown in FIG. 5, planning system 400 may be operated according to an example method of generating a set of data values through a data planning graphical control, i.e., according to method 500 illustrated by blocks 510-516 in FIG. 5.

At block 510, a user interface including a data planning graphical control element and a set of data values may be generated. For example, a user interface may be generated based on uploaded data, where the user interface includes various UI control elements.

At block 512, user input is received to modify the data planning graphical control element. For example, a viewing user of the user interface may generate user input, such as dragging a control point upwards or downwards in the user interface, to modify the UI control element(s). Various UI control elements may be included in the user interface as described above with respect to FIGS. 2*a*-2*f*, such as control points, lines connecting the control points, a slider GUI, a locking toggle element on other control elements, and a curve modifying icon.

At block 514, modified data values may be determined based on the received user input. For example, based on the received user input, a data analysis module may determine modified data values using the uploaded data as a basis.

At block 516, a display of the modified data values is generated, the display including the modified data planning graphical control element on the user interface as the set of data values. For example, the modified data values are used to generate the graphical control element as the set of data values, as described at block 510. The method 500 then continues to block 510 and repeats for additional user input.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A computer-implemented method, comprising:

generating a user interface on a user device, the user interface including a data planning graphical control element and a set of data values, wherein the data planning graphical control element comprises a set of control point user interface elements corresponding to the set of data values and a curve modifier;

receiving user input on the data planning graphical control element that generates a curve through the curve modifier, the user input received at the user interface to shape the curve on the data planning graphical control element;

generating a line between at least two control point user interface elements of the set of control point user interface elements of the data planning graphical control element;

determining a Bezier curve analysis based on a received user input at the curve modifier;

rendering the line connecting the at least two control point user interface elements based on the Bezier curve analysis as the data planning graphical control element;

determining an amount of distance and a directionality of the received user input on the data planning graphical control element, wherein the curve is shaped by determining an amount of curvature of the line based on the amount of distance and the directionality;

determining a plurality of modified data values based on the received user input shaping the curve to match a known mathematical curve associated with a mathematical operation, the plurality of modified data values calculated using the mathematical operation associated with the known mathematical curve based on the amount of curvature of the line; and generating a display on the user device of the modified data values including the data planning graphical control element displayed as the curve on the user interface, wherein the user interface uses the modified data values as the set of data values.

2. The computer-implemented method of claim 1, further comprising:

generating a slider user interface element that indicates an aggregate data value of the set of data values, wherein the slider user interface element is configured to modify the aggregate data value responsive to the slider user interface element being dragged upwards or downwards;

receiving second user input on the slider user interface element that indicates a percentage change in the aggregate data value;

calculating a new set of data values based on the percentage change in the aggregate data value;

modifying the data planning graphical control element based on the new set of data values replacing the set of data values, wherein the set of control point user interface elements are adjusted based on the new set of data values; and rendering the curve on the user interface based on the new set of data values as the data planning graphical control element for display on the user device.

3. The computer-implemented method of claim 2, wherein the slider user interface element comprises a toggle to lock the aggregate data value at a selected modification, the method further comprising:

receiving a selection on the toggle to lock the slider user interface element at a selected aggregated value that modifies the aggregate data value of the set of data values;

receiving additional user input on the data planning graphical control element that indicates a change in a selected data value of the set of data values based on dragging an associated control point user interface element upwards or downwards;

calculating a second set of data values based on a selected aggregate data value and the additional user input that indicates the change in the selected data value of the set of data values;

modifying the data planning graphical control element based on the second set of data values replacing the set of data values, wherein the set of control point user interface elements are adjusted based on the second set of data values; and rendering the curve on the user interface based on the second set of data values as the data planning graphical control element for display on the user device.

4. The computer-implemented method of claim 1, wherein the set of data values is uploaded to a data modeling platform.

5. The computer-implemented method of claim 1, wherein the user interface comprises a toggle to lock a data value on a particular control point user interface element of the set of control point user interface elements, the computer-implemented method further comprising:

receiving a selection on the toggle to lock the particular control point user interface element at a selected data value;

calculating an affected set of data values adjacent to the selected data value based on at least two Bezier curve analyses;

modifying the data planning graphical control element based on the affected set of data values adjacent to the selected data value replacing a subset of the set of data values, wherein a subset of the set of control point user interface elements are adjusted based on the affected set of data values; and rendering the curve on the user interface based on the affected set of data values as the data planning graphical control element for display on the user device.

6. The computer-implemented method of claim 1, wherein the known mathematical curve is one of a linear, a logarithmic curve, and an exponential curve.

7. The computer-implemented method of claim 1, wherein:

receiving the user input comprises:

receiving a dragging motion on the data planning graphical control element in a direction.

8. The computer-implemented method of claim 1, further comprising:

generating a locking toggle user interface element that enables an indication to lock in a certain data value for a control point;

receiving second user input on the locking toggle user interface element that indicates the certain data value for the control point;

receiving third user input to flatten the curve of the data planning graphical control element, the third user input received through the user interface on the curve modifier; and determining a new set of data values based on the certain data value and a flattened shape using the Bezier curve analysis.

9. A system, comprising:

a processor;

a non-volatile memory;

a user interface (UI) controller, operable by the processor on the non-volatile memory, the UI controller configured to:

generate a user interface, the user interface including a data planning graphical control element and a set of data values, wherein the data planning graphical control element comprises a set of control point user interface elements corresponding to the set of data values and a curve modifier;

receive user input on the data planning graphical control element that generates a curve through the curve modifier, the user input received at the user interface to shape the curve on the data planning graphical control element;

generate a line between at least two control point user interface elements of the set of control point user interface elements of the data planning graphical control element;

determine a Bezier curve analysis based on a received user input at the curve modifier;

render the line connecting the at least two control point user interface elements based on the Bezier curve analysis as the data planning graphical control element;

determine an amount of distance and a directionality of the received user input on the data planning graphical control element, wherein the curve is shaped by determining an amount of curvature of the line based on the amount of distance and the directionality;

determine a plurality of modified data values based on the received user input shaping the curve to match a known mathematical curve associated with a mathematical operation, the plurality of modified data values calculated using the mathematical operation associated with the known mathematical curve; and generate a display of the modified data values including the data planning graphical control element displayed as the curve on the user interface, wherein the user interface uses the modified data values as the set of data values.

10. The system of claim 9, wherein the UI controller is further configured to:

generate a slider user interface element that indicates an aggregate data value of the set of data values, wherein the slider user interface element is configured to modify the aggregate data value responsive to the slider user interface element being dragged upwards or downwards;

receive second user input on the slider user interface element that indicates a percentage change in the aggregate data value;

calculate a new set of data values based on the percentage change in the aggregate data value;

modify the data planning graphical control element based on the new set of data values replacing the set of data values, wherein the set of control point user interface elements are adjusted based on the new set of data values; and render the curve on the user interface based on the new set of data values as the data planning graphical control element for display on a user device.

11. The system of claim 10, wherein the slider user interface element comprises a toggle to lock the aggregate data value at a selected modification, the UI controller further configured to:

receive a selection on the toggle to lock the slider user interface element at a selected aggregated value that modifies the aggregate data value of the set of data values;

receive additional user input on the data planning graphical control element that indicates a change in a selected data value of the set of data values based on dragging an associated control point user interface element upwards or downwards;

calculate a second set of data values based on a selected aggregate data value and the additional user input that indicates the change in the selected data value of the set of data values;

modify the data planning graphical control element based on the second set of data values replacing the set of data values, wherein the set of control point user interface elements are adjusted based on the second set of data values; and render the curve on the user interface based on the second set of data values as the data planning graphical control element for display on the user device.

12. The system of claim 9, wherein the set of data values is uploaded to a data modeling platform.

13. The system of claim 9, wherein the user interface comprises a toggle to lock a data value on a particular control point user interface element of the set of control point user interface elements, and wherein the UI controller is further configured to:

receive a selection on the toggle to lock the particular control point user interface element at a selected data value;

calculate an affected set of data values adjacent to the selected data value based on at least two Bezier curve analyses;

modify the data planning graphical control element based on the affected set of data values adjacent to the selected data value replacing a subset of the set of data values, wherein a subset of the set of control point user interface elements are adjusted based on the affected set of data values; and render the curve on the user interface based on the affected set of data values as the data planning graphical control element for display on a user device.

14. The system of claim 9, wherein the known mathematical curve is one of a linear, a logarithmic curve, and an exponential curve.

15. The system of claim 9, wherein the UI controller is further configured to:

generate a locking toggle user interface element that enables an indication to lock in a certain data value for a control point;

receive second user input on the locking toggle user interface element that indicates the certain data value for the control point;

receive third user input to flatten the curve of the data planning graphical control element, the third user input received through the user interface on the curve modifier; and determine a new set of data values based on the certain data value and a flattened shape using the Bezier curve analysis.

16. A computer-implemented method, comprising:

providing, by a data modeling platform, a user interface for display on a user device communicably coupled to the data modeling platform, the user interface including a data planning graphical control element and a set of data values retrieved from an interactive data table;

receiving at the data modeling platform from the user device, user input to define a shape of the data planning graphical control element, the user input received through the user interface;

determining a matching curve from a plurality of known curves, the matching curve associated with a mathematical operation based on an amount of curvature identified in the shape of the data planning graphical control element;

receiving, by the data modeling platform, an indication to lock in a certain data value for a control point;

receiving second user input to flatten the shape of the data planning graphical control element, the second user input received through the user interface; and determining a new set of data values based on the certain data value and a flattened shape using Bezier curve analysis based on the mathematical operation;

generating the new set of data values to replace the set of data values in the interactive data table; and sending the new set of data values to the interactive data table to replace the set of data values and to the user device to be rendered on the user interface.

17. The computer-implemented method of claim 16, wherein the matching curve is determined based on the shape of the data planning graphical control element.

18. The computer-implemented method of claim 16, wherein the new set of data values is determined, in part, based on applying the mathematical operation to each data value of the set of data values.

19. The computer-implemented method of claim 16, wherein the mathematical operation comprises a linear operation, a logarithmic operation, or an exponential operation.

20. The computer-implemented method of claim 16, further comprising:

generating a line between at least one other control point of the data planning graphical control element;

determining a second Bezier curve analysis based on a received second user input at the control point;

rendering the line connecting the at least one other control point based on the second Bezier curve analysis as the data planning graphical control element; and determining an amount of distance and a directionality of the received second user input on the data planning graphical control element and the received second user input at the control point, wherein the shape of the data planning graphical control element is further defined by the amount of curvature of the shape based on the amount of distance and the directionality.

* * * * *